United States Patent [19]

Dick

[11] 3,942,606
[45] Mar. 9, 1976

[54] METHOD OF LAND SEISMIC EXPLORATION USING FLEXIBLE TUBES
[75] Inventor: Charles W. Dick, Houston, Tex.
[73] Assignee: Western Geophysical Company of America, Houston, Tex.
[22] Filed: July 8, 1974
[21] Appl. No.: 486,725

Related U.S. Application Data
[62] Division of Ser. No. 376,644, July 5, 1973, Pat. No. 3,840,846.

[52] U.S. Cl.............. 181/122; 86/20 C; 102/24 R; 181/108; 181/116; 340/17 R; 181/407
[51] Int. Cl.² .................... G01V 1/10; G01V 1/16
[58] Field of Search ............... 86/20 C; 102/24 R; 340/15.5 CP, 17; 181/116, 401, 108, 402, 110, 122

[56] References Cited
UNITED STATES PATENTS

| | | | |
|---|---|---|---|
| 2,133,484 | 10/1938 | Sherar | 181/.5 EC |
| 2,316,596 | 4/1943 | Kennedy | 181/.5 EC |
| 2,745,346 | 5/1956 | Aitchison et al. | 86/20 C |
| 3,113,518 | 12/1963 | Doan | 102/24 R |
| 3,188,906 | 6/1965 | Beck | 86/20 C |
| 3,301,345 | 1/1967 | Carder | 181/401 |
| 3,610,089 | 10/1971 | Cook et al. | 86/20 C |

Primary Examiner—Maynard R. Wilbur
Assistant Examiner—H. A. Birmiel
Attorney, Agent, or Firm—Michael P. Breston

[57] ABSTRACT

This invention relates to a land seismic exploration method and apparatus employing a plurality of elongated tubes each having a flexible wall for containing a volume of liquid explosive therein. Each tube is adapted to be detachably connected to either a detonating device for exploding the liquid explosive therein thereby creating a seismic explosion, or to a pressure transducer for monitoring the pressure changes in the liquid explosive caused by the detected seismic pressure waves.

5 Claims, 8 Drawing Figures

U.S. Patent  March 9, 1976  3,942,606
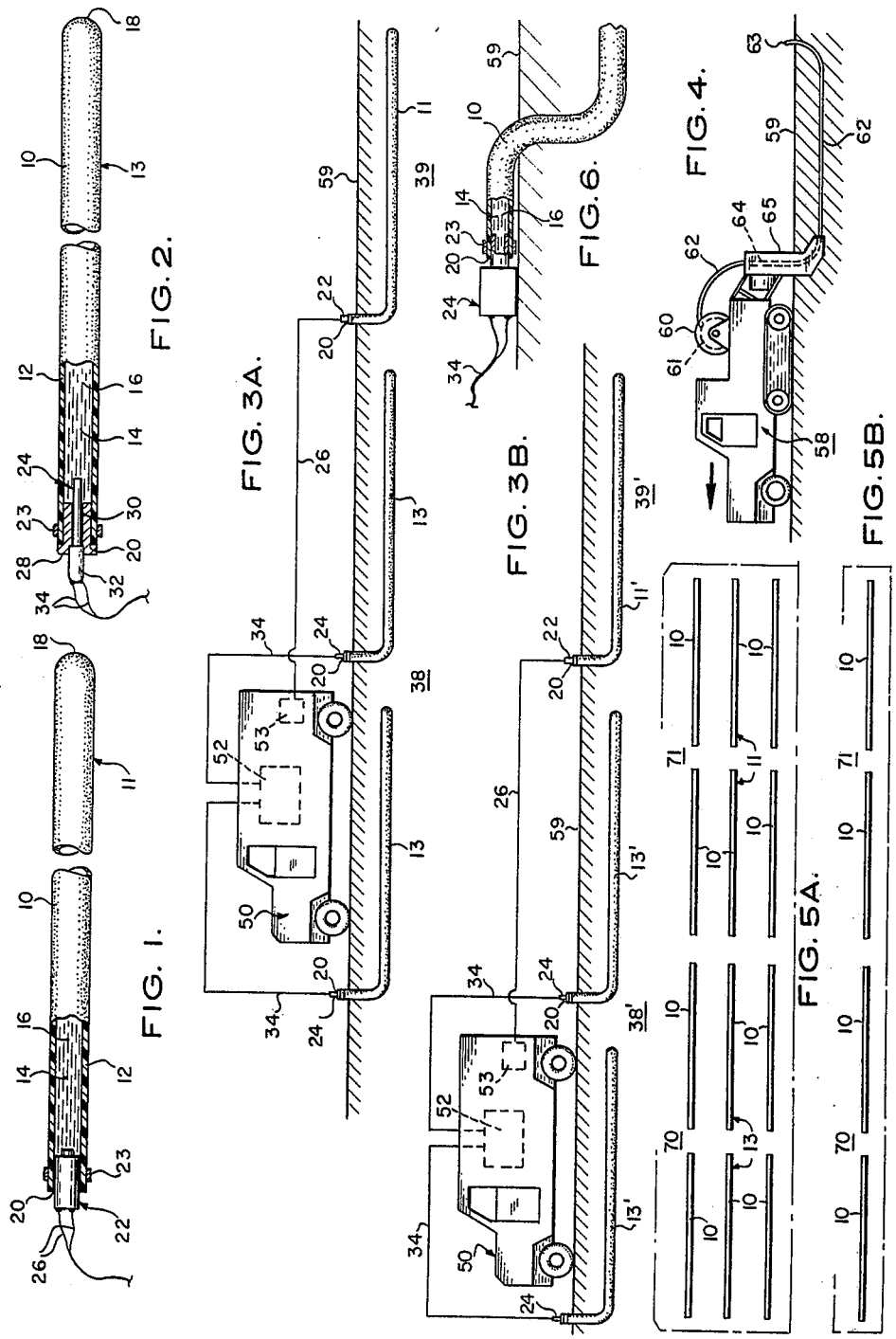

METHOD OF LAND SEISMIC EXPLORATION USING FLEXIBLE TUBES

This is a division of application Ser. No. 376,644, filed July 5, 1973, now U.S. Pat. No. 3,840,846.

BACKGROUND OF THE INVENTION

Various seismic energy sources are known and used. Some act as "point" sources, others as "linear" sources. An example of a point source is an explosive cartridge, an example of a linear source is a long strand of detonating fuse such as Primacord, manufactured by Ensign-Bickford, Inc. of Simsbury, Connecticut. For best coupling to the ground such linear souces are desirably buried a few feet below the earth's surface. A vibratory plow, such as manufactured by the Charles Machine Works, Inc. of Perry Oklahoma, can be used for mechanically burying the Primacord without appreciably disturbing the earth. In practice, the linear sources are grouped in a desirable pattern depending on well-known consideration related to the particular site being seismically explored. In the vicinity of the "shooting site" are also deployed strings of seismic detectors or geophones. One or more of the linear energy sources are detonated and the resulting reflected seismic signals are detected by the detectors for recording on a suitable medium, typically magnetic tape. Customarily the geophones are set out on the surface of the earth, however, to minimize the detection of background noise, the geophones could also be buried a short distance below the earth's surface. The deployment and the burial of the geophones would be time consuming operations which would add considerably to the overall cost of seismic exploration.

After a series of seismic shots are made at the first shooting site, the seismic crew repeats the steps of burying the linear seismic sources and of deploying the geophones at another site, and the steps of shooting and recording are again repeated.

Although subsurface burial of the Primacord is mechanized, the relocation of the groups of geophones from detecting site to detecting site still requires considerable hand labor in the preparation of the detecting site and the deployment of the detectors.

It is a general object of the present invention to provide a new method of land seismic prospecting which minimizes the amount of hand labor required. The invention also provides new apparatus useful in carrying out the method.

SUMMARY OF THE INVENTION

The novel method employs groups of elongated tubes. Each tube is completely filled with an explosive liquid and can be converted either into a linear seismic energy source, by coupling a detonator thereto, or into a seismic detector by coupling a pressure transducer thereto. Thus a tube after first serving as a seismic detector can be converted into an energy source located in the position of the previously used detector.

BRIEF DESCRIPTION OF THE DRAWINGS

FIG. 1 shows a linear energy source employing a liquid-explosive filled tube;

FIG. 2 shows a linear detector employing a liquid-explosive filled tube;

FIGS. 3A and 3B show the progress of a seismic party by using groups of buried tubes, one or more of which is converted into a seismic energy source and the remaining tubes converted into pressure detectors for monitoring the reflected seismic signals;

FIG. 4 illustrates a method of burying the tubes;

FIGS. 5A and 5B illustrate typical pattern arrangements for the tubes; and

FIG. 6 shows another embodiment of a seismic detector.

In the drawings, the same numerals are used to designate the same or similar parts whenever possible to aid in the understanding of the invention.

Referring to FIGS. 1 and 2, the land seismic prospecting method of the present invention employs elongated tubular members 10. Each elongated tubular member 10 has a flexible wall 12 to allow it to transmit compressional seismic waves into a liquid 14 which completely fills bore 16 of tube 10. One end 18 of tube 10 is sealed off and its other end forms a mouth 20 which is adapted to interchangeably receive either a conventional, electrically-operated detonating device 22, or a conventional pressure transducer assembly 24. Detonator 22 has a pair of input wires 26. The transducer assembly 24 may include a bushing 28 defining a center bore 30 for housing a pressure-responsive transducer or hydrophone 32 having output leads 34.

Since mouth 20 can interchangeably receive either the detonator 22 or the pressure transducer assembly 24, each tube 10 can be transformed into a linear energy source 11 or into a linear detector 13.

A suitable clamp 23 seals and secures member 22 or 24 to the wall of mouth 20 so that bore 16 becomes fluid tight. The diameter of bore 16 will depend on the nature of the liquid explosive employed and typically is on the order of one-half inch or less. The considerations for selecting a suitable liquid explosive and a desirable diameter for bore 16 are discussed in various publications, e.g., "Chemistry & Technology of Explosives" by Urbansky, Pergamon Press, 1965, Volume 2, Library of Congress Catalog No. 63-10077.

The length of each tube 10 will depend on the "seismic punch" of the area as well as on the noise patterns in the vicinity of the shooting site and may be on the order of several hundred feet. These considerations are well-known to those skilled in the art and are taken into account when using other known linear energy sources such as Primacord.

In carrying out the method of the present invention, a group 38 (FIG. 3A) consisting of linear detectors 13 is buried in the ground. The group usually will contain several such detectors 13 arranged in a predetermined pattern. A group 39 consisting of at least one linear energy source 11 is also buried near the group 38 of linear detectors 13. For simplicity of the drawing, only two linear detectors 13 and one linear energy source 11 are shown in the drawings.

A suitable vehicle 50 carries a recording apparatus 52 to which are connected the output leads 34 from each transducer assembly 24. The detonating device 22 of the energy source 11 is connected to a blaster 53, also carried by vehicle 50, for applying current to wires 26 at the desired instant of shooting, thereby actuating detonator 22.

When detonator 22 is actuated by the blaster 53, the explosive liquid 14 inside tube 10 will explode with a detonatio velocity on the order of several thousand meters per second. The resulting energy from source 11 will propagate through the earth's underlying formations and the reflected compressional seismic waves therefrom will impinge upon the flexible walls of the linear pressure detectors 13. The pressure waves established in the liquid explosive of each linear detector 13 are detected by its pressure transducer 32. The output of the pressure transducer 32 is recorded by the recording system 52 on vehicle 50.

To repeat the shooting and recording cycle, the linear detector 13 adjacent to linear source 11 is converted into a new linear energy source 11', by replacing its pressure transducer assembly 24 with a detonator 22 (FIG. 3B), thereby forming a new group 39'. At the same time another linear transducer detector 13' is buried ahead of the linear detector 13 to re-establish a new group 38' of linear detectors for the new linear energy source 11' created from the former linear detector 13 of FIG. 3A. The blasting and recording cycles are then repeated in a manner described in connection with FIG. 3A.

The burial of the tubes in the ground can be mechanized by the use of the vibratory plow schematically illustrated in FIG. 4. It includes a reel 60 on which is rotatably mounted a spool 61 of flexible tubing 62, the free end 63 of which, is threaded through a bore 64 in a generally L-shaped blade 65. The plow 58 is designed to bury the plastic tubing without trenching and without appreciably disturbing the ground 59. The burial depth may be from 6 inches up to thirty or more inches.

One method of using the plow 58 is to seal off the free end 63 of flexible tubing 62 and to bury a length of said tubing, say on the order of three hundred feet or more, whereupon tubing 62 is cut from the spool 61. The open cut end or mouth 20 of the already buried tube is brought out above the ground surface (as shown in FIGS. 3A and 3B. Next, either a pressure transducer assembly 24 or a detonator 22 is inserted into mouth 20, as required, after completely filling tube 10 with a desired liquid explosive. In order to effect such filling, the free end 63 (FIG. 4) should be left above ground so that air displaced by the liquid can be allowed to escape. On the other hand, the tubing 62 on spool 61 can be prefilled with the liquid explosive so that after a desired length of tubing is buried in the ground all that remains is to insert into the mouth 20 either a detonator 22 or a pressure transducer assembly 24. In this case the free end 63 may be buried initially as there is then no need to have access to the end from the surface.

In FIG. 5A is shown a group 70 of linear pressure detectors 13 and a group 71 of linear energy sources 11. Each group may be made up from a serial or serial-parallel arrangement of tubes 10. The shooting pattern can be varied as desired: all the energy sources 11 can be detonated simultaneously, or in timed sequence. After the destruction of the tubes in group 71, the tubes in the adjacent group 70 will be changed from linear detectors into linear energy sources.

Alternatively, tubes 10 can be arranged in serial, end-to-end, spaced-apart relationship as illustrated in FIG. 5B. It is to be understood that any of the state-of-the-art seismic source-receiver configurations may be employed in practice of this invention.

Those skilled in the seismic surveying art are familiar with the necessary relationships between detonation rates and lengths and patterns of seismic sources.

The volume 2 reference of Urbansky, supra, discusses the detonation rate of various liquid explosives as a function of the diameter of the tube in which the explosive is contained. Additional data concerning diameters and detonation rates are generally available from the manufacturers or suppliers of such liquid explosives, for example, from Hercules Incorporated, Wilmington, Delaware.

In FIG. 6 is shown another embodiment of the novel seismic detector of this invention wherein the pressure-responsive transducer 24 is external to and is detachably connected to the tube 10. Transducer 24 is in fluid communication with the liquid 14 and is responsive to the pressure variations therein.

The major portion of the tube in FIG. 6 is buried beneath the earth's surface while the transducer 24 and a minor portion of the tube protrude above the earth's surface. As far as the detector itself is concerned, the liquid 14 in the embodiment of FIG. 6 may be any incompressible liquid such as is used, for example, in seismic streamer cables. Since the major portion of the tube is buried, excellent coupling is obtained between the detector and the earth.

What is claimed is:

1. A detector for detecting seismic pressure waves in the earth comprising:
    a flexible-walled, elongated tube filled with liquid, and
    a pressure-responsive transducer detachably connected to said tube and in communication with said liquid the major portion of said liquid-filled tube being adapted to be buried beneath the surface of the earth, and said transducer together with a minor portion of said tube being adapted to protrude from the surface of the earth.

2. A detector for detecting seismic pressure waves, comprising:
    a flexible-walled, elongated tube,
    an explosive liquid filling said tube, and
    a pressure transducer operatively coupled to said explosive liquid to monitor pressure variations in said liquid corresponding to seismic pressure waves impinging on the external wall of said tube, said liquid exerting said pressure variations on said transducer.

3. The detector of claim 2 wherein said transducer is mounted externally of said tube.

4. A method of detecting seismic signals which are reflected from the underlying layers of the earth, comprising:
    coupling to the earth at least one elongated, flexible tube having a pressure detector associated therewith and an incompressi explosive liquid completely filling said tube, said detector being responsive to pressure variations in said liquid produced by said reflected signals.

5. A detector for detecting seismic pressure waves in the earth comprising:
    a flexible-walled, elongated tube filled with liquid, and a pressure responsive transducer connected to said tube and in communication with said liquid, the major portion of said liquid-filled tube being buried beneath the surface of the ground.

* * * * *